W. Wright,

Bed Spring.

No. 4,286. Reissued Feb. 28. 1871.

Witnesses:

A. Bennemendorf.

Wm Ho. C. Smith.

Inventor:

W. Wright.

per Munn & Co

Attorneys.

N. PETERS, PHOTO-LITHOGRAPHER, WASHINGTON, D. C.

United States Patent Office.

WENDELL WRIGHT, OF NEW YORK, N. Y.

Letters Patent No. 16,254, dated December 16, 1856; extended seven years; reissue No. 4,286, dated February 28, 1871.

IMPROVEMENT IN THE MODES OF SECURING SPRINGS IN UPHOLSTERY.

The Schedule referred to in these Letters Patent and making part of the same.

*To all whom it may concern:*

Be it known that I, WENDELL WRIGHT, of New York city, in the county and State of New York, have invented a new and improved Mode of Securing Springs in Upholstery; and I do hereby declare that the following is a full, clear, and exact description thereof, which will enable others skilled in the art to make and use the same, reference being had to the accompanying drawing forming a part of this specification, in which—

Similar letters of reference indicate corresponding parts.

Figure 1:
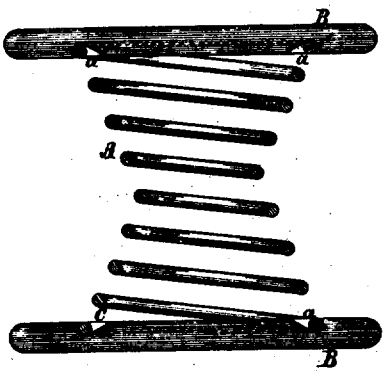
Figure 1 represents a vertical section of a spring and its two seats, showing the spring secured to the seats according to my improved method.
Figure 2:
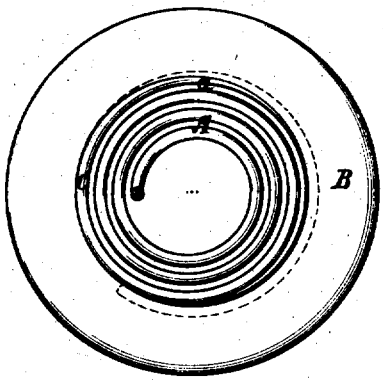
Figure 2 is a transverse section of the spring.

This invention relates to a new construction of upholstered articles, such as bed-bottoms, chairs, sofas, &c., and to a novel method of securing the springs in place to their seats.

The invention consists, first, in supporting the upper slat of an upholstered bed-bottom or seat by upright springs only, the straps, lateral springs, or braces hitherto employed to aid in such supports being unnecessary.

The invention consists, also, in providing an annular groove in each seat of the spring, and in making the greater part of each coil, at the ends of the spring, horizontal and somewhat larger in diameter than the grooves in the seats, so that said coils may be fitted in the grooves, to be retained therein by their elasticity.

A in the drawing represents a wire spring of the usual form employed for upholstering purposes.

B B are the two seats of the spring.

Each seat has an annular groove, *a*, made in it to eceive one end of the spring A.

The last coil, at each end of the spring A, has about three-fourths or four-fifths of its length, more or less, made horizontal, as indicated in fig. 1, so that the spring will have a good bearing surface in the grooves *a*.

The outer coils C are made somewhat larger in diameter than the grooves, so that, when they are contracted and fitted in the grooves, the elasticity of the coils will cause them to bind firmly in the grooves, and thereby secure the spring to the seats.

The above improvement is valuable for several reasons. At present the springs require guide-pins, and, in some cases, lateral springs or braces are employed to prevent the displacement of the springs from their seats.

But, by securing the springs to their seats as shown, they are retained in proper position within a mattress, cushion, or seat, and each spring is independent of the other, no special connection being required for sustaining the upper slat or plate B.

Having thus described my invention,

What I claim as new, and desire to secure by Letters Patent, is

1. The bed-bottom, cushion, or seat, whose upper slat or plate is supported by the upright springs only, as set forth.

2. The spring A, secured to its seats B B by having annular grooves *a* made in the seats, one in each, and having the greater portion of the coils at the ends of the spring made or bent in a horizontal form, and somewhat larger in diameter than the grooves *a*, substantially as and for the purpose herein shown and described.

WENDELL WRIGHT.

Witnesses:

A. V. BRIESEN,

ALEX. F. ROBERTS.